United States Patent [19]
Teranishi

[11] Patent Number: 6,052,241
[45] Date of Patent: Apr. 18, 2000

[54] METHOD AND APPARATUS FOR MINIMIZING ERASURE ERRORS DURING INFORMATION RECORDING/REPRODUCING

[75] Inventor: Yasuhiko Teranishi, Yokosuka, Japan

[73] Assignee: Victor Company of Japan, Ltd., Yokohama, Japan

[21] Appl. No.: 08/935,991

[22] Filed: Sep. 23, 1997

[30] Foreign Application Priority Data

Sep. 24, 1996 [JP] Japan ................................ 8-274065
Nov. 22, 1996 [JP] Japan ................................ 8-327959

[51] Int. Cl.[7] ............................ G11B 27/02; G11B 5/09; H04N 5/93
[52] U.S. Cl. .......................... 360/13; 360/48; 360/53; 386/52; 386/54
[58] Field of Search ................ 360/48, 53, 57, 360/60, 54, 13; 386/52, 54, 4

[56] References Cited

U.S. PATENT DOCUMENTS

| | | | |
|---|---|---|---|
| 4,348,698 | 9/1982 | Schomann | 360/24 |
| 4,438,464 | 3/1984 | Odaka | 360/13 |
| 5,311,372 | 5/1994 | Matsumi et al. | 360/22 |

*Primary Examiner*—Aristotelis M. Psitos
*Assistant Examiner*—Regina Y. Neal
*Attorney, Agent, or Firm*—Eugene Lieberstein; Michael N. Meller

[57] ABSTRACT

An information recording/reproducing apparatus for recording information signals on a recording medium as a track pattern having two tracks adjacent to each other, and for reproducing the information signals recorded on the recording medium. The apparatus comprises pre-reproduction device for reproducing the information signal recorded on one of the two tracks adjacent to each other on the recording medium upon rewriting for a renewal of the information signal recorded on another of the two tracks; and re-recording device for re-recording the information signal reproduced by the pre-reproduction device on an identical position as being initially recorded on the one of the two tracks in the recording medium.

6 Claims, 7 Drawing Sheets

METHOD AND APPARATUS FOR MINIMIZING ERASURE ERRORS DURING INFORMATION RECORDING/REPRODUCING

BACKGROUND OF THE INVENTION

1. Field of the Invention

The present invention relates to an improvement of an information recording/reproducing-apparatus such as a video tape recorder (VTR) and a digital audio tape recorder (DAT) for recording and reproducing information signals such as a video signal and an audio signal on and from a recording medium, and an information recording/reproducing method applied to the apparatus.

2. Description of the Related Art

FIG. 1 is a schematic plan view showing tracks (TR1–TR14) formed on a magnetic tape by a digital video tape recorder for recording digitized video and audio information thereon in a helical scanning system.

In a digital video tape recorder (referred to as digital VTR) employing a helical scanning system, a magnetic tape is helically wound around a rotary drum having magnetic heads, and video and audio information signals being digtized are recorded on the magnetic tape.

As shown in FIG. 1, in this example, the audio information signals of two channels (CH1, CH2) and the video information signal are recorded in a time sharing manner on each of tracks formed on a magnetic tape T.

Video information signal of one video frame period included in nth frame is recorded on tracks TR2 to TR7, and the same included in the subsequent (n+1)th frame is recorded on tracks TR8 to TR13.

During the one video frame period of the nth frame, the audio information signal of CH1 is recorded on the track TR2 to TR4 and the audio information signal of the CH2 is recorded on the track TR5 to TR7. In this example, an amount of the audio information signal to be recorded during the one video frame period is made constant.

Generally, in order to renew the information recorded on a part of the tracks, the part of the track is preliminarily erased by a flying erase head. Then, new information signal is recorded on the erased part by a magnetic head. For instance, when the video information signals of the nth and (n+1)th frames are renewed, the video signals of the tracks TR2 to TR13 are erased, and new video signals are recorded thereon. The reason of the preliminary erasure by using the flying erase head is to prevent an error rate at reproduction from increasing, otherwise an overwriting without such a preliminary erasure causes a large error rate at reproduction of the new information signal.

Taking account of tracking error between the former recording and the renewing of the information, it is desirable to use a flying erase head having a track width larger than that of the track. However, this flying erase head causes a problem to erase parts of the tracks TR1 and TR14 in a track width direction, which should not be erased, resulting in an increase of the error rate because of a decrease of a signal level at reproduction. When the error rate developed exceeds a limit of error correcting ability of the apparatus, the reproduced image is degraded in quality due to a partial loss of the information data.

Generally, to prevent a part of a track from being undesirably erased, non-recorded sections, so called guard bands, are provided between the tracks. Thereby, it is possible to prevent the undesirable erasure of the tracks, however, these guard bands cause a problem to increase a track pitch between the tracks, resulting in a decrease of recording capability of the magnetic tape of a given length.

FIG. 2 is a schematic plan view showing a track pattern having guard bands at every two tracks in the prior art.

As a countermeasure to avoid such an over-erasure, guard bands are provided between groups of two tracks as shown in FIG. 2. Thereby, it is possible to prevent the partial track erasure without decreasing much recording capacity upon renewal of recorded information as a unit of frame, and to prevent the increase of the error rate upon reproduction.

However, when one of the two channels of the audio information signals is desired to be rewritten, there occurs a problem as follows.

Specifically, when the audio information signal of CH1 recorded in the nth frame and the (n+1)th frame is desired to be rewritten, parts of the audio data of CH2 recorded on the tracks TR5 and TR11 are erased in the track width direction because the guard bands are provided between the tracks TR1, TR2 and between the tracks TR7, TR8, but not between the tracks TR4, TR5 and between the tracks TR10, TR11.

SUMMARY OF THE INVENTION

Accordingly, a general object of the present invention is to provide information recording/reproducing apparatuses, in which the above disadvantages have been eliminated.

A specific object of the present invention is to provide an information recording/reproducing apparatus capable of renewing recorded information by rewriting one of two tracks abutted on each other without degrading a recording state of another track even when a guard band is not provided between the two tracks adjacent to each other or a very narrow guard band is provided therebetween.

A more specific object of the present invention is to provide an information recording/reproducing apparatus for recording information signals on a recording medium as a track pattern having two tracks abutted on each other, and for reproducing the information signals recorded on the recording medium comprising: pre-reproduction means for reproducing the information signal recorded on one of the two tracks adjacent to each other on the recording medium upon rewriting for a renewal of the information signal recorded on another of the two tracks; and re-recording means for re-recording the information signal reproduced by the pre-reproduction means on an identical position as being initially recorded on the one of the two tracks in the recording medium.

Another and more specific object of the present invention is to provide an information recording/reproducing apparatus capable of recording/reproducing video and audio information signals on/from a recording medium, the apparatus being constructed to utilize a recorded pattern of a group of two tracks adjacent to each other, each of the tracks having both a video area for recording the video information signal and an audio area for recording the audio information signal, the audio information signals of n (n>1) channels being recorded in portions of the audio area of the tracks corresponding to one video information unit period, an auxiliary information signal indicating if the audio information signal is significant, being added to each of the audio information signals of m (m<n, integer) channels among the audio information signals of the n channels, wherein the apparatus is capable of rewriting/editing the audio information signals of (n−m) channel except for the m channels, the apparatus comprising: pre-reproduction means for reproducing the audio information signal of one of the m channels prior to rewriting/editing the audio information signals recorded on one of the (n−m) channels of one of the two tracks abutted on each other; and a control means for quitting the rewriting/editing when the auxiliary information signal indicates that the audio information signal is significant.

Other specific object of the present invention is to provide a method for recording/reproducing an information signal on a recording medium with a recorded pattern having groups of tracks adjacent to each other, the method comprising the steps of: reproducing an information signal recorded on one of the two tracks abutted on each other prior to rewriting/editing another of the two tracks; and recording the information signal reproduced on the same position on the recording medium again.

Other objects and further features of the present invention will be apparent from the following detailed description.

DETAILED DESCRIPTION OF THE PREFERRED EMBODIMENT

Description is now given of a first to a fifth embodiment of an information recording/reproducing apparatus
[First embodiment]

Figure 3:
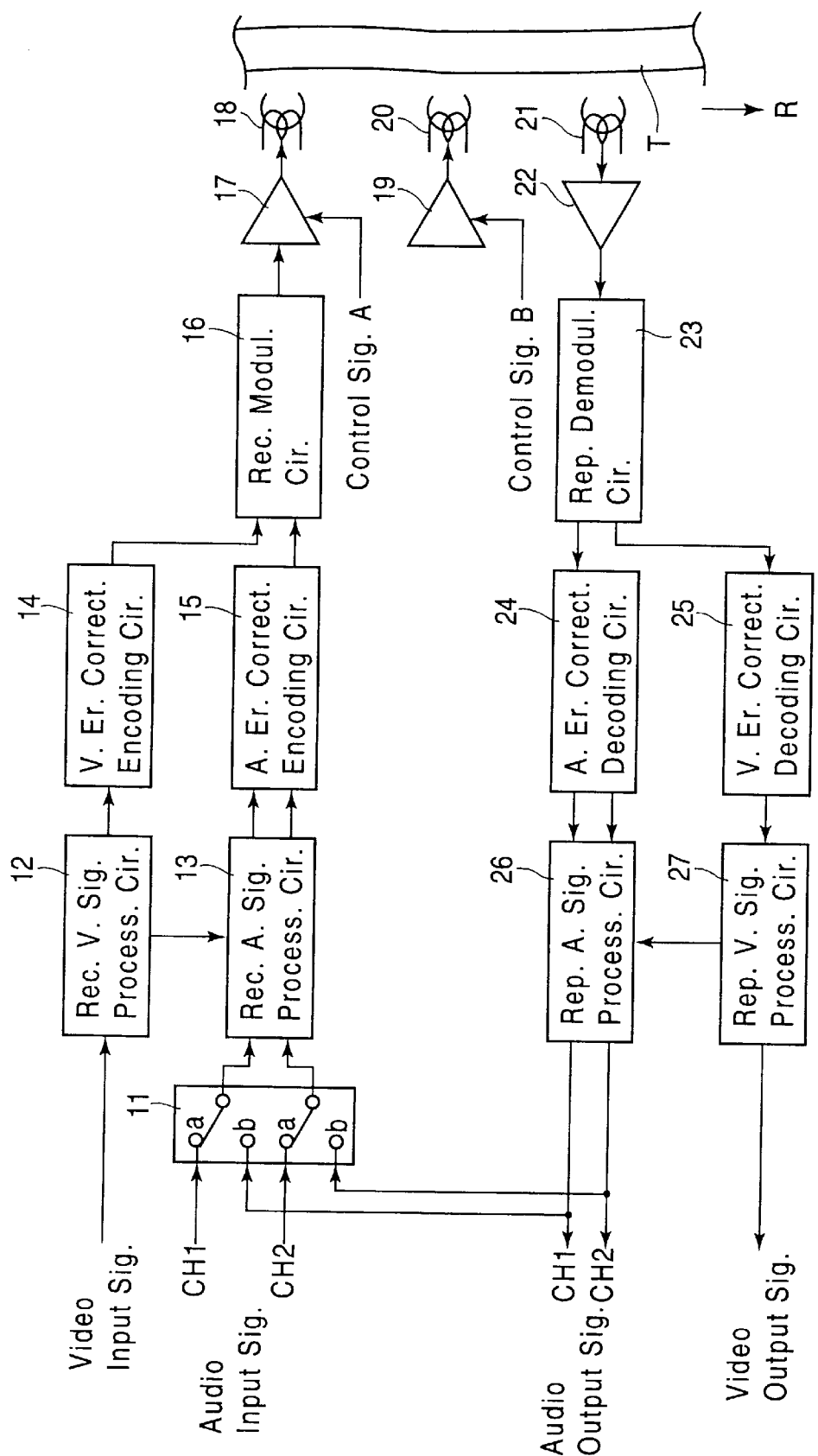
FIG. 3 is a block diagram of a main part of a digital VTR of a first embodiment in the present invention.

FIG. 3 is a block diagram of a main part of a digital VTR of a first embodiment in the present invention.

First, the description is given of a recording system of the first embodiment. It should be noted that input signals used therein are digitalized.

Referring to FIG. 3, an input video signal is fed to a recording video signal processing circuit 12. The recording video signal processing circuit 12 performs predetermined recording processes such as dividing the signal into blocks, discrete cosine conversion (DCT) and quantization of the input video signal, and feeds processed video data to a video error correction encoding circuit (referred to as V error correction encoding circuit hereinafter) 14, and a timing information signal indicating one video frame period to a recording audio signal processing circuit 13 so as to synchronize the video data with audio data. The V error correction encoding circuit 14 encodes the inputted video data to error correction encoded data, and supplies them to a recording modulation circuit 16.

On the other hand, audio input signals of two channels, i.e., CH1 and CH2, are fed in parallel to the recording audio signal processing circuit 13 through a switch 11. Upon recording operation, the switch 11 is usually set to a terminal position "a". Thus, the audio input signals of CH1 and CH2 are fed to the recording audio signal processing circuit 13.

After having performed such as signal shuffling processing, the recording audio signal processing circuit 13 feeds the processed audio data of CH1 and CH2 to an audio error correction encoding circuit (referred to as A error correction encoding circuit hereinafter) 15. After having encoded the inputted audio data of CH1 and CH2 to error correction encoded data independently, the A error correction encoding circuit 15 feeds the encoded audio data of CH1 and CH2 to the recording modulation circuit 16 in such a timing that they form a tape pattern corresponding to the tracks TR2 to TR4 (CH−1) and the tracks TR5 to TR7 (CH−2) shown in FIG. 2, respectively.

The recording modulation circuit 16 selects both the video data and the audio data in such a timing as corresponding to their positions to be recorded on the tracks, and adds synch-words to detect synchronization of the data upon reproduction, and performs a recording modulation encoding of the data to allow the data to be recorded on a magnetic tape T, and feed them to a recording amplifier 17. Upon normal recording operation, the recording amplifier 17 amplifies inputted signals and feeds them to a recording head 18 to record the inputted signals on the magnetic tape T. And upon editing recording operation for renewing information recorded on one part of the tracks, the recording amplifier 17 feeds the inputted signals to the recording head 18 according to a control signal A directing rewriting timing.

In the digital VTR of the first embodiment, a flying erase head 20 is provided ahead of the recording head 18, and a reproducing head 21 further ahead of the flying erase head 20 with respect to a rotational direction of the rotary drum shown with an arrow R.

Upon the editing recording operation, the data recorded on the magnetic tape T are erased by the flying erase head 20 in such a manner that an erase current is fed to the flying erase head 20 from an erase current amplifier 19 according to a timing indicated by a control signal B. However, it is possible to directly overwrite data without erasing the previous data by the flying erase head 20.

Next, a description is given of a reproduction system.

Outputted signal from the reproducing head 21 is fed to a reproducing demodulation circuit 23 through a reproduction amplifier 22. The reproducing demodulation circuit 23 demodulates the signals modulated at the recording, and separates the video data from the audio data, and feeds the audio and video data to an audio error correction decoding circuit (referred to as A error correction decoding circuit hereinafter) 24 and a video error correction decoding circuit (referred to as V error correction decoding circuit hereinafter) 25, respectively. The A and V error correction decoding circuits 24, 25 perform error correction decoding of the audio and video data referring to their error correction codes respectively, and supply the processed audio and video data to a reproduction audio signal processing circuit 26 and a reproduction video signal processing circuit 27 respectively. Further, if unrecoverable error data are found, the A error correction decoding circuit 24 performs flag adding processing for indicating the existence of the unrecoverable error data.

The reproduction video signal processing circuit 27 performs a predetermined reproduction processing, i.e., reversing procedures of the recording processes such as dequantization, reverse-DCT, and rearrangement of the data, and outputs the processed signal as a reproduced video output signal, in addition, supplies the timing information signal indicating one video frame period to the reproduction audio signal processing circuit 26.

The reproduction audio signal processing circuit 26 performs a reverse processing of the recording processing, wherein such reverse-shuffling is performed and so on. In addition, when the flag for indicating the existence of the unrecoverable error data is contained in an audio data, the circuit 26 restores the unrecoverable error data by using both preceding and succeeding sampled data as the sampling data of audio signal, and outputs the restored data as a reproduction audio signal. This reproduced audio signal is also inputted to the terminals "b" of the switch 11.

Next, the description is given of an operation of the digital VTR shown in FIG. 3.

Upon the normal recording, the switch 11 is (maintained to be) set to the terminals "a", and each of the inputted video and audio signals (CH1, CH2) undergoes certain recording processes through the recording video signal processing circuit 12, the recording audio signal processing circuit 13, the V and A error correction encoding circuits 14, 15, and the recording modulation circuit 16. As a result, the inputted video and audio signals are recorded on the magnetic tape T forming a tape pattern shown in FIG. 2 by the recording head 18. In this case, an erase current is not applied to the flying erase head 20.

Upon the normal reproduction, the data reproduced by the reproducing head 21 undergo certain reproducing processes which are the reverse processing of the recording processes through the reproducing demodulation circuit 23, the A and V error correction decoding circuits 24, 25, and the reproduction audio and video signal processing circuits 26, 27, and they are outputted as a video output signal and an audio output signal.

Further, upon editing recording for renewing only the audio data of CH1 in the nth and (n+1)th frame periods, the operation is as follows.

First, the switch 11 is set to the terminal "b" only for the audio output signal of CH2. And, the audio data of CH2 recorded on the tracks TR5 to TR7 are reproduced from the magnetic tape T by the reproducing head 21 prior to the editing recording, and the reproduced audio signal is inputted to the recording audio signal processing circuit 13 through the terminal "b" of the switch 11. In this case, a positional relation between the reproducing head 21 and the recording head 18 installed on the rotary drum (not shown), i.e., a preceding distance of the reproducing head 21 with respect to the recording head 18, is determined so that a rewriting timing of the audio data of CH1 to be rewritten accords with a timing of the reproduced audio data of CH2.

Accordingly, the audio data of CH1 to be rewritten and the reproduced audio data of CH2 are applied to the recording audio signal processing circuit 13 in synchronization with each other, and are processed in the same manner as that of the ordinary recording operation.

It should be noted that in the first embodiment, a number of audio sampled data to be recorded is determined to be a predetermined one, and the predetermined number is always maintained consistent.

While such a control signal A for operating the recording amplifier 17 in a period corresponding to the audio area of the tracks TR2 to TR7 is applied to the recording amplifier 17, the control signal B is applied to the erase current amplifier 19 to cause the flying erase head 20 to erase the data corresponding to the audio area of the tracks TR2 to TR7 prior to rewriting.

As to the track TR8 to TR13, the same processing as mentioned above is performed, thus rewriting of the audio data in the nth and (n+1)th frame period is completed.

Further, when the audio data of CH2 is rewritten, the switch 11 is set to the terminal "b" only for the audio signal of CH1, and the same processing as mentioned above is performed.

According to this embodiment, the audio data which are not an object of renewing, is reproduced preceding to rewriting, and both the reproduced audio data and the new audio data to be rewritten are recorded on the respective tracks again.

Figure 1:
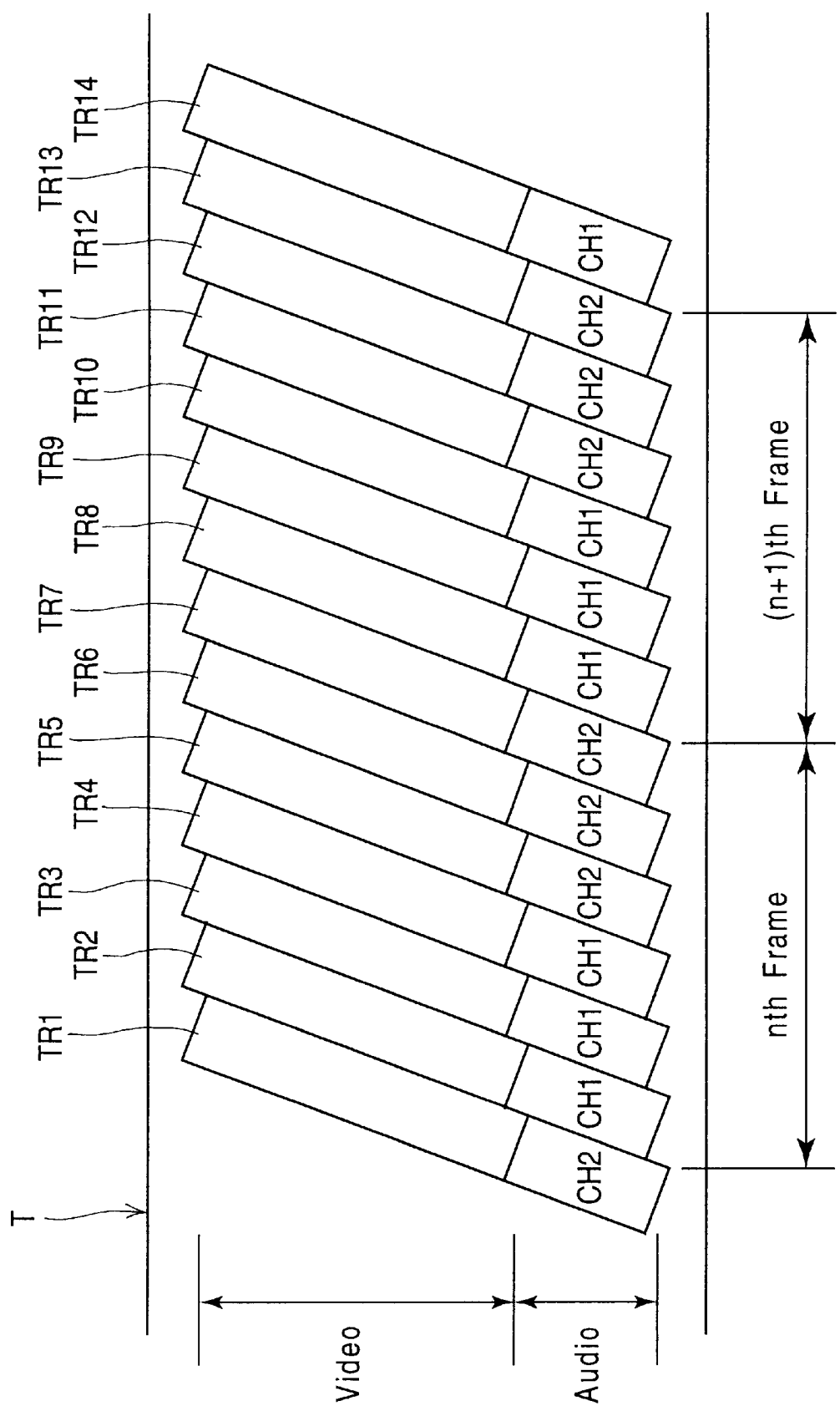
FIG. 1 is a schematic plan view showing tracks (TR1–TR14) recorded on a magnetic tape by a digital video tape recorder for recording digitized video and audio
Figure 2:
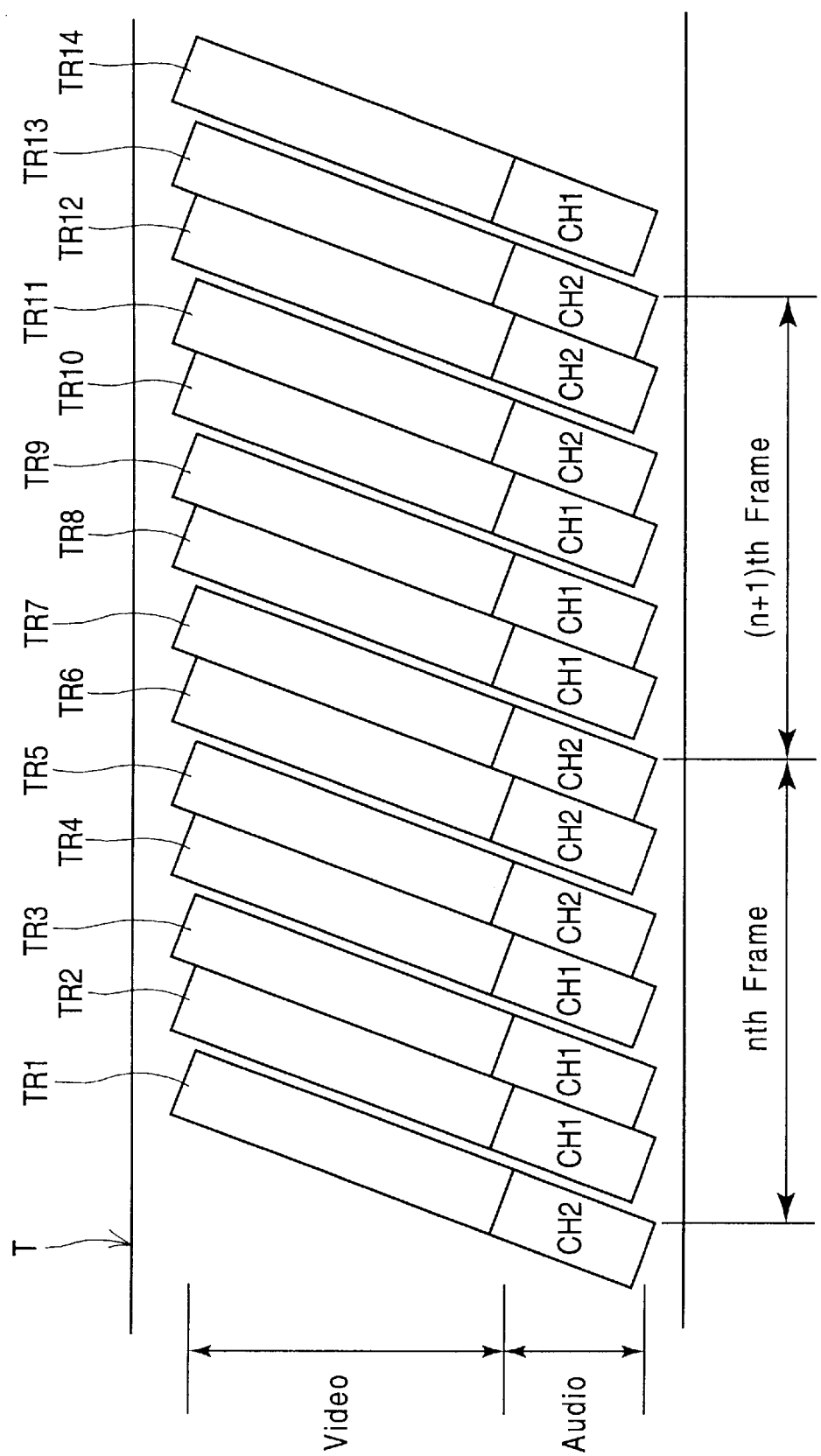
FIG. 2 is a schematic plan view showing a track pattern having guard bands provided every two tracks.

Thus, it is possible to rewrite the audio data every channel without degrading the audio data which are not an object of renewing even when the guard bands are provided at every two tracks as shown in FIG. 2. As a result, the increase of error rate is prevented at the editing process, resulting in both an extended play and an editing every audio channel.

[Second embodiment]

In the first embodiment, it is assumed that the number of audio sampled data recorded on the audio data area of the tracks TR5 to TR7 is a predetermined number. However, there may be a case where a sampling period of the audio input signal and the one video frame period are not locked. In this case, before the audio data is applied to the recording audio signal processing circuit, the sampling rate of the audio input signal is required to be converted in such a manner that the sampling rate is locked with the one frame period, resulting in a complicated circuit.

As a countermeasure, there is a method where the number of the audio sampled data is made variable upon recording, and the number representing the amount of the data is recorded on the audio data area together with the data to be recorded. Specifically, both the audio sampling data inputted in the the video nth frame period and the number of the audio sampled data are recorded on the tracks TR2 to TR4 with respect to the audio data of CH1 and the tracks TR5 to TR7 with respect to the audio data of CH2. Upon reproduction, the audio sampled data are reproduced being referred to the number of data in one frame period.

When the above method is applied to the digital VTR of the first embodiment, there is a potential problem as follows.

Generally, when one video frame period and a sampling period are not locked to each other, the number of the sampled data to be recorded in one video frame period may be deviated every video frame. Thus, the numbers of the audio sampled data of CH1 and CH2 recorded on the tracks TR2 to TR13 of the audio area at an initial state does not always coincide with the number of the audio sampled data reproduced therefrom in advance of rewriting.

Specifically, in the first embodiment as mentioned in the foregoing, the number of the sampled data to be recorded is predetermined. Thus, when the number of the audio sampled data being recorded is larger than the number of sampled data capable of being recorded in the nth and (n+1)th frame period, one part of the sampled data reproduced from the tracks TR5 to TR7 and TR11 to TR13 in advance of rewriting is impossible to be recorded again. In such a case, a dropout of sampled data occurs between the (n+1)th and (n+2)th frames. The dropout of sampled data causes abnormal sound in the reproduction.

Figure 4:
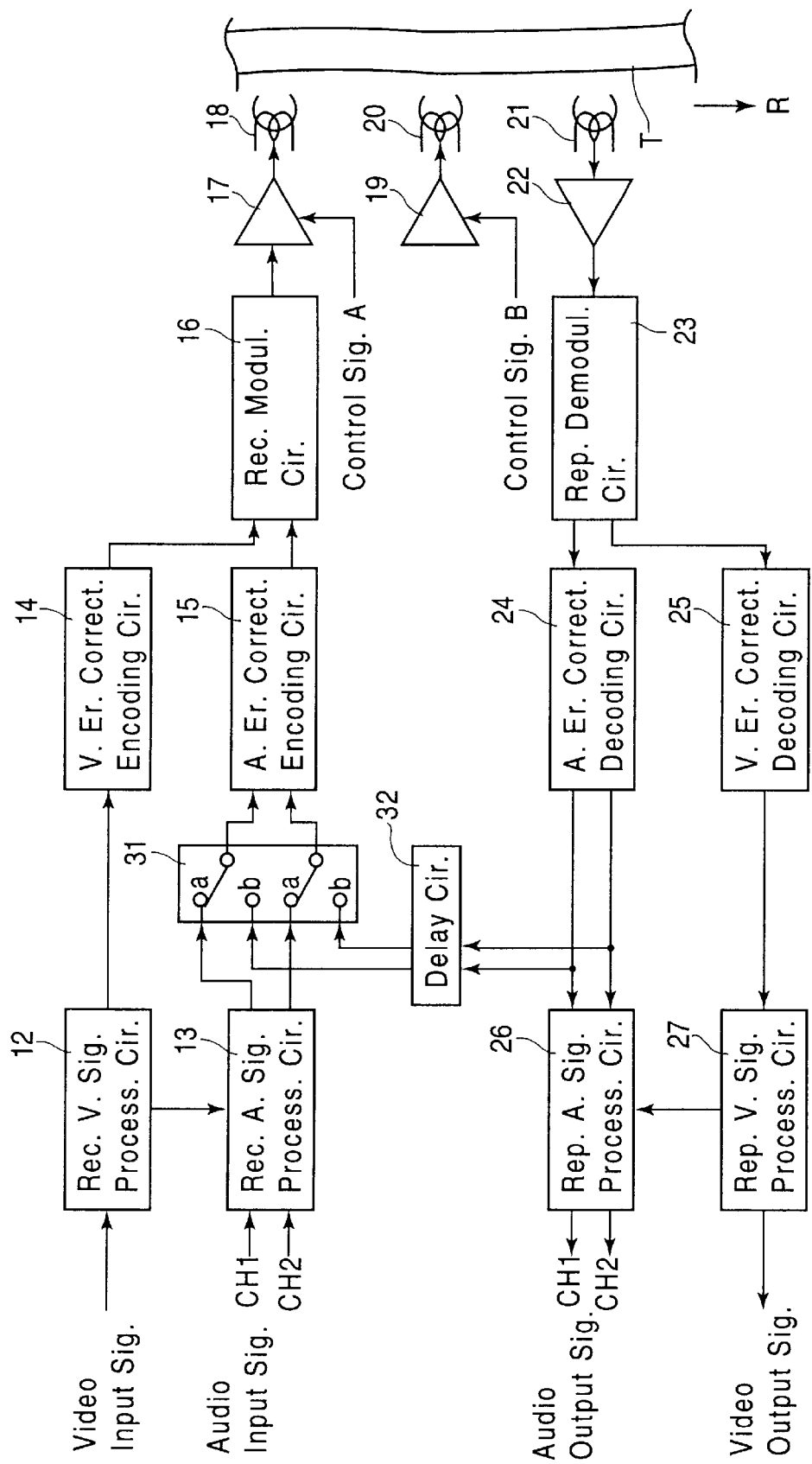
FIG. 4 is a block diagram showing a main part of a digital VTR of a second embodiment in the present invention.

FIG. 4 is a block diagram showing a main part of a digital VTR of a second embodiment in the present invention.

Accordingly, in the digital VTR of the second embodiment, a construction shown in FIG. 4 is employed instead of the one shown in FIG. 3.

In the construction of the second embodiment shown FIG. 4, the switch 11 shown in FIG. 3 is removed, and instead of that the switch 31 is provided between the recording audio signal processing circuit 13 and the A error correction encoding circuit 15, and the data outputted from the A error correction decoding circuit 24 is applied to terminals "b" of the switch 31 through a delay circuit 32. Other construction is the same as that of the first embodiment shown in FIG. 3.

Next, the description is given of different points in operation from the digital VTR of the first embodiment as follows.

The A error correction decoding circuit 24 detects and corrects the data error referring to the error correction code added at recording as mentioned in the first embodiment. When a unrecoverable error data is detected, the A error correction decoding circuit 24 converts a value of the error data to a value of inhibited data. For instance, in a case of 16 bit data, a value of [8000h (h denotes hexadecimal system)] is given as the inhibited data.

The delay circuit 32 feeds its input signal to the switch 31 by causing a delay time corresponding to a sum of a time required for signal processing in the reproducing audio signal processing circuit 26 and a time required for signal processing in the recording audio signal processing circuit 13.

The switch 31 is set to the terminal "b" for the audio data of CH2 for a predetermined switching period when the audio data of CH1 is rewritten. This switching period is controlled so that the switch 31 is set to the terminal "b" only while the audio data of CH2 of the track TR5 are outputted from the delay circuit 32. In this case, the renewed audio data of CH1 to be rewritten on the tracks TR2 to TR4 are also applied to the A error correction encoding circuit 15 through the switch 31.

The A error correction encoding circuit 15 performs both coding of the audio sampled data to be recorded on the audio area of the tracks TR2 to TR4 and encoding of the audio sampled data inputted from the delay circuit 32 to be recorded on the audio area of the track TR5. After that the A error correction encoding circuit 15 applies the audio data of CH1 and CH2 to the recording modulation circuit 16 in a timing corresponding to the tracks TR2 to TR4 and the track TR5, respectively.

The recording amplifier 17 is controlled by the control signal A in such a manner that it only operates during a period corresponding to the audio areas of the tracks TR2 to TR4 and the track TR5. The erase current amplifier 19 is also controlled by the control signal B in such a manner that the flying erase head 20 erases only the audio data in the tracks TR2 to TR5.

As mentioned above, there are performed the rewriting of the audio data of CH1 in the nth frame, and the pre-reproduction in advance of the rewriting and re-recording of the audio data of CH2 of which a part of the track TR5 is erased by the flying erase head 20.

The rewriting of the audio data of CH1 in the (n+1)th frame is performed in the same manner as mentioned above. In this case, it is the audio data of CH2 of the track TR11 from which the signal is reproduced in advance of rewriting and re-recorded thereon, because a part of the audio data of the track TR11 is erased by the flying erase head 20.

Upon normal reproducing, when such data as having the inhibited value (8000h) outputted from the A error correction decoding circuit 24 is inputted to the reproducing audio signal processing circuit 26, the circuit 26 handles it as the unrecoverable data. In other words, an interpolated value obtained by using the two data adjacent to the unrecoverable data replaces the value of the unrecoverable data. Thus, it is possible to reproduce the audio data normally.

As mentioned above, in the digital VTR of the second embodiment, upon reproducing and re-recording the data which is not an object of rewriting at editing recording, the outputted data from the A error correction decoding circuit 24 is directly supplied to the A error correction encoding circuit 15 through the delay circuit 32. Thus, it is possible to prevent the abnormal sound from occurring at the editing part even when the number of the audio data to be recorded during one frame period is deviated or variable, because the number of the sampled data to be rewritten coincides with the number of the data already recorded.

Further, as the error data is made to be the inhibited data value and is re-recorded on the corresponding track, it is not necessary to provide an error correction circuit (a circuit for performing interpolation correction) in the path for feeding back the audio data which are not the object of rewriting, from the reproducing system to the recording system, resulting in a simple construction of the circuit.

Further, in the audio data of CH2 in the nth frame, the track to be reproduced prior to rewriting and re-recording is limited to only one track (the track TR5 of which a part is erased by the flying erase head 20). This allows other tracks (TR6, TR7) to remain as they are, resulting in a prevention of dropout of sound when the recording head 18 malfunctions.

[The third embodiment]

In the first and second embodiments mentioned in the foregoing, there includes a potential problem that when the reproducing head 21 is contaminated and the output signal level of the reproducing head 21 is greatly decreased, resulting in an increase of error rate. Accordingly, when the number of the error data is beyond a certain threshold, it is impossible for the A error correction decoding circuit 24 to correct the error data any more. In this case, the audio data to be re-recorded on the corresponding track via the delay circuit 32 will be greatly degraded compared with the original audio data.

Accordingly, a third embodiment of the present invention is conceived, in which the editing operation is intended to be instantly stopped when the number of the error data is beyond the limit of the error data correcting ability of the system.

Figure 5:
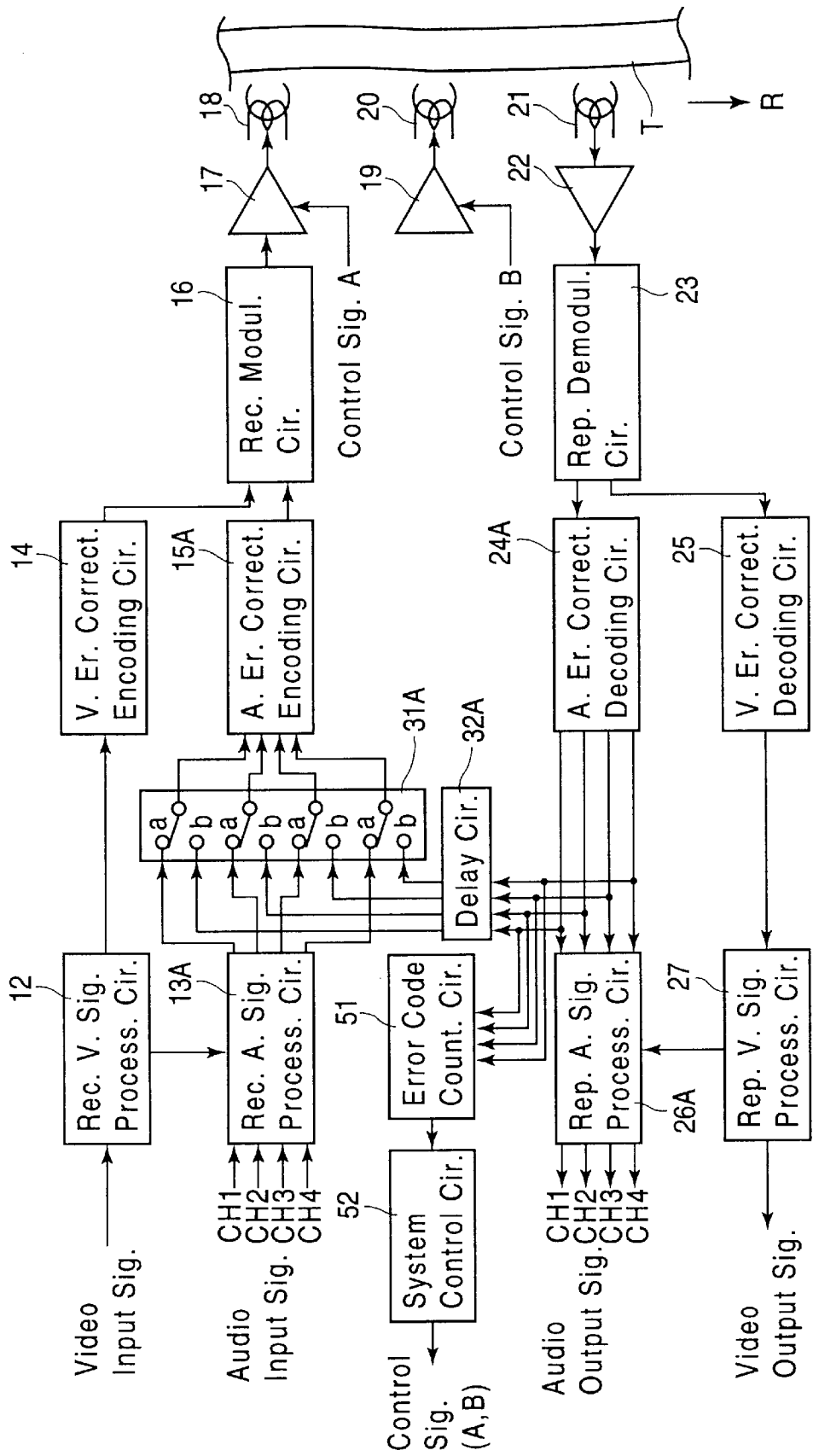
FIG. 5 is a block diagram showing a main part of a digital VTR of a third embodiment in the present invention.

FIG. 5 is a block diagram showing a main part of a digital VTR of a third embodiment in the present invention.

In the digital VTR of the third embodiment, there are provided an audio signal processing system of four channels to allow four channel audio signals to record and reproduce on the tracks at both normal and editing recording. Further, there are provided an error encode counting circuit 51 for counting unrecoverable error data at the audio reproduction, and a system control circuit 52 for controlling the system of the digital VTR corresponding to an output from the error code counting circuit 51.

Specifically, the recording audio signal processing circuit 13, the A error correction encoding circuit 15, the A error correction decoding circuit 24, the reproducing audio signal processing circuit 26, the switch 31 and the delay circuit 32 shown in FIG. 4 are respectively replaced with a recording audio signal processing circuit 13A, an A error correction encoding circuit 15A, an A error correction decoding circuit 24A, a reproducing audio signal processing circuit 26A, a switching circuit 31A and a delay circuit 32A, each having four channels to allow the four channel audio signals to be recorded and reproduced on the tracks of the magnetic tape T. Further, the output signal from the A error correction decoding circuit 24A is applied to the error code counting circuit 51.

The error correction code of the third embodiment has a structure of a product code composed of an inner correction code and an outer correction code. Each of the inner and outer codes has a Reed Solomon code in which eight bits are made as one symbol or one code word.

The inner correction code is made of (88, 80) Reed Solomon code and the outer correction code is made of (150, 140) Reed Solomon code. Further, as to the audio sampled data, one sampled data is made of 16 bits, and are divided into two parts, i.e., an upper half of 8 bits and a lower half of 8 bits which make a symbol or a byte, respectively. Thus, the upper and lower sections of 8 bits make up a pair of symbols.

Other constructions are the same as those of the second embodiment shown in FIG. 4. Incidentally, the digital VTR of the second embodiment has a system control circuit corresponding to the one shown in FIG. 5, however, it is not depicted in FIG. 4 because it has only ordinary functions of the digital VTR.

Figure 7:
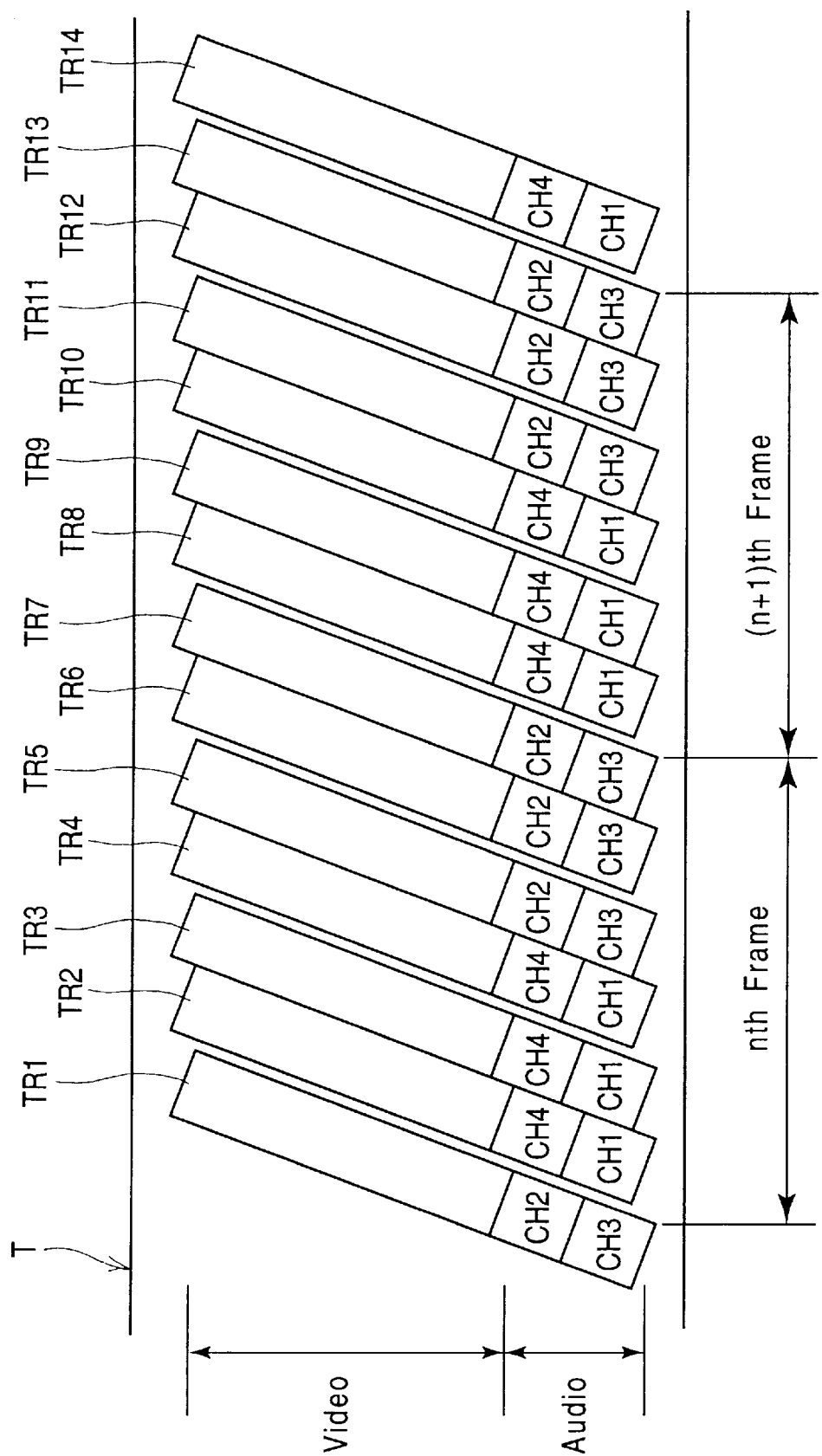
FIG. 7 is a schematic plan view showing a track pattern having four channels for audio data.

FIG. 7 is a schematic plan view showing another track pattern having four channels for audio data.

According to the digital VTR of the third embodiment, the recorded pattern on the magnetic tape becomes as shown in FIG. 7.

Specifically, as to the nth frame, the audio data of CH1 and CH4 are recorded on the tracks TR2 to TR4 and those of CH2 and CH3 are recorded on the tracks TR5 to TR7. When the audio data of CH1 in the nth frame is only rewritten, the editing recording operation is performed as follows.

First, the audio data of CH3 of the track TR5 is reproduced by the reproducing head 21 prior to rewriting, and the data reproduced are fed to the A error correction decoding circuit 24A through the reproducing demodulation circuit 23. After decoding the inner and outer correcting codes, the A error correction decoding circuit 24A corrects error symbols when it identifies the number of the error symbols to be within its ability of error correction.

On the other hand, when the A error correction decoding circuit 24A identifies the number of the error symbols to be beyond its ability of error correction, it converts the error detected symbols and the other part of the pairs with respect to the error detected symbols (i.e, when the error symbol is the upper half of 8 bits in the pair, the other part of the pair is the lower half of 8 bits or when the error symbol is the lower half of 8 bits in the pair, the other part of the pair is the upper half of 8 bits) into error codes, and outputs them.

Generally, the error detecting ability is superior to the error correcting ability, thus it is possible to perform such error code conversion even when it is impossible to perform the error correction because the position of the error data can be detected.

Further, as the error code, for instance, the inhibited value of 8000h as mentioned in the second embodiment is divided in two error codes, i.e., an upper half of 8 bits and a lower half thereof.

The output signals from the A error correction decoding circuit 24A are fed to the reproducing audio signal processing circuit 26A, the delay circuit 32A and the error code counting circuit 51. The error code counting circuit 51 counts the number of the error codes in the data produced from the track TR5. When the number of the error codes is larger than the predetermined number, the error code counting circuit 51 notifies the fact to the system control circuit 52 (the notice thereof is referred to as an majority error code notice hereinafter). When the system control circuit 52, which has also functions to control overall operations of the digital VTR, receives the majority error code notice, it instantly stops operation of the erase current amplifier 19 and the recording amplifier 17 and running the magnetic tape T, and displays on a display section (not shown) the fact that the number of the error code is larger than the predetermined number.

On the other hand, when the number of the error codes is not more than the predetermined number, the editing operation is successively performed, i.e., the audio data of CH1 of the tracks TR2 to TR4 and the audio data of CH3 of the track TR5 are erased by the flying erase head 20. At the same time, both the outputs from the delay circuit 32A and the outputs from the recording audio signal processing circuit 13A are fed to the switching circuit 31A. Then, the switching circuit 31A is set to the terminal "b" for the audio data of CH3 for a predetermined period, and the output from the delay circuit 32A is fed to the A error correction encoding circuit 15A. The A error correction encoding circuit 15A performs the error correction encoding of the audio data of CH1 to be recorded on the tracks TR2, TR3 and TR4, and of the data outputted from the delay circuit 32A to feed all of them to the recording modulation circuit 16. Then, the same processing as mentioned in the second embodiment is performed, resulting in that the audio data of CH1 is rewritten on the tracks TR2, TR3 and TR4, and the audio data of CH3 is re-recorded on the track TR5. In summary, when the number of the error codes is not more than the predetermined number, the audio data of CH3 recorded on the track TR5 are reproduced prior to rewriting, and the audio data of CH1 recorded on the tracks TR2 to TR4 and the audio data of CH3 recorded on the track 5 are erased. Then, the audio data of CH3 are error correction-decoded and are delayed at a predetermined time by the delay circuit 32A. As a result, the audio data of CH3 are again error correction-encoded by the A error correction encoding circuit 15A, and are again re-recorded on the audio area of CH3 of the track TR5.

As mentioned in the foregoing, according to the third embodiment, when the reproduced signal is greatly decreased due to a contamination of the reproducing head 21 and the number of the error data in the reproduced data is larger than the predetermined number which is beyond the error correcting ability of the system, the editing recording is instantly stopped. Thus, it is possible to prevent a case where the recorded audio data are replaced with the ones greatly degraded compared to the original data.

Further, when a warning message indicating the number of the error codes being beyond the predetermined number is displayed on the display section, it is possible for the user to eliminate the contamination of the reproducing head 21 or to inspect the reproduction circuit system. Thus, the causes of degradation can be removed before operating the editing recording again.

Further, in the third embodiment a forcible editing recording mode is added to allow the user to perform the editing recording operation successively regardless of the warning message. When the same message is displayed on the display section after the inspection, it is considered that the real cause is due to the deterioration of the recorded part of the track TR5 itself. Thus, the user may select the forcible editing recording mode and perform the editing recording again.

[Fourth embodiment]

In the digital VTR of a fourth embodiment of the present invention, the function of the error code counting circuit 51 for counting the number of the error codes as mentioned in the third embodiment is replaced with a function of counting a number of unrecoverable flag as mentioned hereinafter. Other basic structures are the same as those of the third embodiment shown in FIG. 5.

More specifically, the A error correction decoding circuit 24A decodes the inner correcting code. When the decoded error data is within the data correcting ability of the system, the decoded error data is corrected. When the decoded error data is beyond the data correcting ability of the system or the result of correction of the error data is less reliable, one unrecoverable flag is made active and is added to the overall inner correcting code. When the error data can be corrected, the unrecoverable flag is made inactive. Further, the A error correction decoding circuit 24A decodes the outer correcting code. When the decoded error data is within the data correcting ability of the system, the decoded error data is corrected. When it is unrecoverable, each of the error symbol of the audio sampled data and the other of the pair thereof is replaced with interpolation value by using preceding and succeeding sampled data adjacent to the error symbol or the other part of the pair. The A error correction decoding circuit 24A outputs the unrecoverable flag together with the audio sampled data.

An error correction unrecoverable flag is provided at every inner correction code. Thus, the number of the unrecoverable flags is outputted corresponding to the number of the inner correction codes in the audio area of CH3 of the track TR5. Thus, the error code counting circuit 51 counts only the number of the error correction unrecoverable flags being activated.

When the number of the error correction unrecoverable flags being activated is larger than the predetermined number, the error code counting circuit 51 notifies the fact to the system control circuit 52. The rest of the processes is the same as those in the third embodiment.

According to the digital VTR of the fourth embodiment, it has an advantage that it is unnecessary to inhibit a certain value as a value of an audio sampled data, resulting in a simple structure.

[Fifth embodiment]

As a low cost type digital VTR capable of recording and reproducing four audio channels, i.e., CH1, CH2, CH3 and CH4 as mentioned in the third and fourth embodiments, it is considered a digital VTR capable of recording/reproducing and writing only two channels among the four channels.

In such a low cost type digital VTR, the audio areas of CH1 and CH2 shown in FIG. 7 are used as the audio data recording areas, and the audio areas of CH3 and CH4 are used as dummy data areas.

In this case, when, for instance, rewriting of the audio data of CH1 of the track TR4 is performed, a part of the audio area of CH3 of the track TR5 in the track width direction is erased. Thus, there is no problem because the audio area of CH3 is the dummy data area.

However, when a magnetic tape T whose all audio areas of CH1 to CH4 are recorded with audio data (i.e., a magnetic tape which is recorded by the digital VTR having a four channel editing function), is required to be edited, there is a problem that a part of the audio data of CH3 in the track width direction is apt to be erased upon rewriting the audio data of CH1.

Therefore, in the fifth embodiment, there is recorded an audio data corresponding to one channel along with some information added thereto on each of the audio areas of CH1 to CH4. As one of the information added thereto, there is provided a dummy flag (referred to as a D flag) for discriminating a significant audio data or not from a dummy data, wherein a dummy flag activated represents a dummy data.

In connection to the fifth embodiment, a basic structure of the digital VTR capable of recording/reproducing four audio channels has approximately the same construction as that of the third embodiment shown in FIG. 5, however, the information to be added to the audio data is performed by the A error correction encoding circuit 15A. In other words, when the audio data are recorded on the audio areas of CH3 and CH4, the D flags thereof are recorded thereon by being inactivated.

Figure 6:
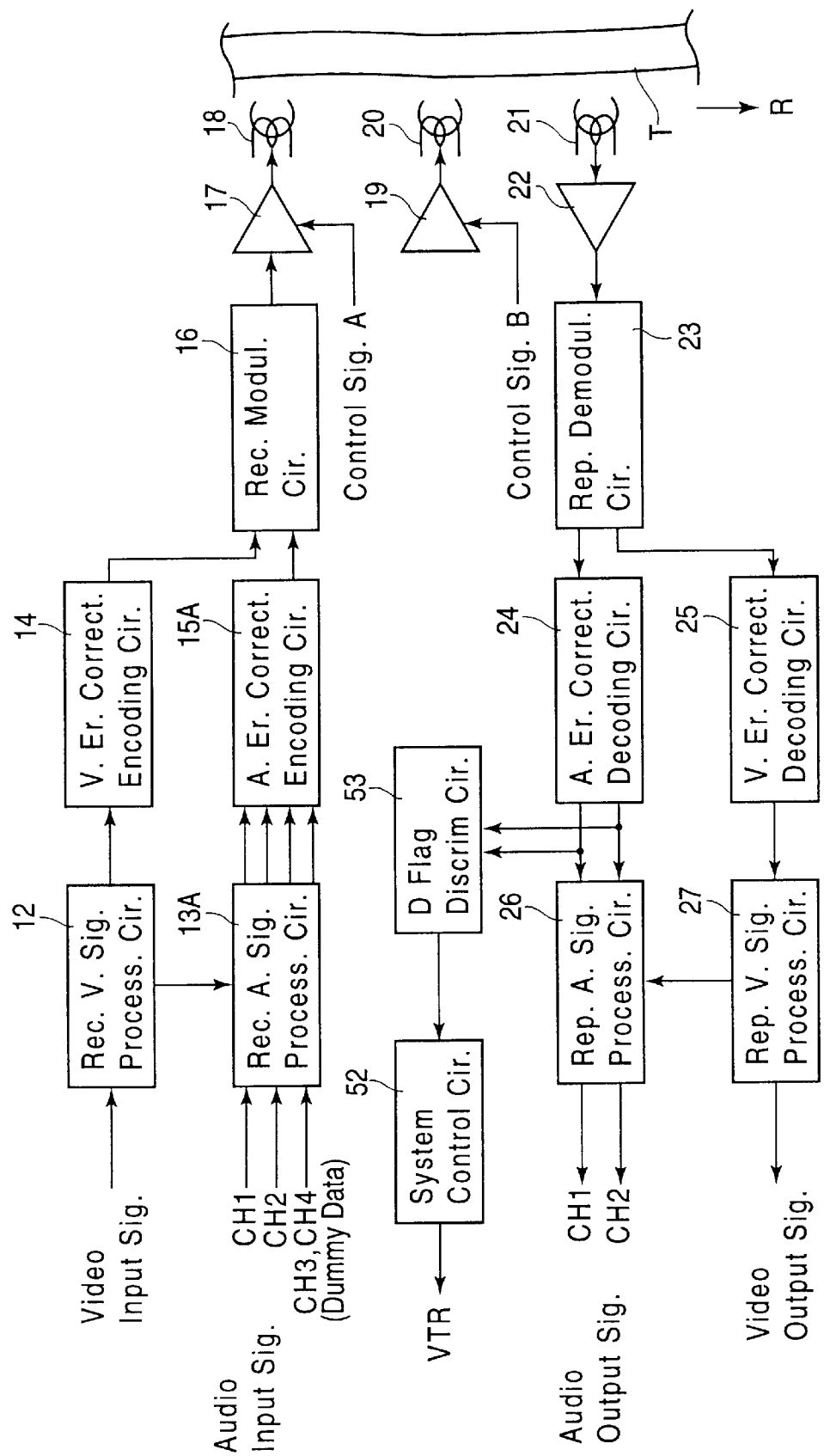
FIG. 6 is a block diagram showing a main part of a digital VTR of a fifth embodiment.

FIG. 6 is a block diagram showing a main part of a digital VTR of a fifth embodiment capable of recording/reproducing the two channels of audio data, wherein the track pattern shown in FIG. 7 is employed.

The digital VTR of fifth embodiment is constructed based on the specification for the recorded tape pattern of four channels shown in FIG. 7, and is possible to record/reproduce the information signals from two channels.

The basic configuration for processing the video and audio signals in the fifth embodiment is approximately the same as that of the digital VTR shown in FIG. 4, however, in the fifth embodiment the dummy data are fed to the recording audio signal processing circuit 13A instead of the audio data of the CH3 and CH4. Thus, the recording audio signal processing circuit 13A and the A error correction encoding circuit 15A respectively have a circuit for four channels. Further, as shown in FIG. 6, the switch 31 and the delay circuit 32 are not provided, and a D flag discriminating circuit 53 for discriminating the D flag activated from the D flag inactivated and the system control circuit 52 for stopping the editing operation responsive to an output signal from the D flag discriminating circuit 53 are provided.

Further, the digital VTR shown in FIG. 6 outputs only the audio data of CH1 and CH2 as the reproduced audio signal, but has a function of reproduction by discriminating the audio areas of CH3 and CH4 from the those of the CH1 and the CH2 recorded on the magnetic tape T.

Next, the description is given of the operation of the editing recording for rewriting the audio data of CH1 in the nth frame referring to FIGS. 6 and 7.

First, prior to rewriting, the audio data of CH3 recorded on the tracks TR5 to TR7 are reproduced. Here, the D flag discriminating circuit 53 discriminates the D flag activated from the D flag inactivated, and notifies the result to the system control circuit 52. When the D flag is activated, the system control circuit 52 continues the editing recording because a loss of the audio data of CH3 is no problem. Specifically, the audio data of CH1 of the tracks TR2 to TR4 and the audio data of CH3 of the track TR5 to TR7 are erased by the flying erase head 20.

Next, the A error correction encoding circuit 15A performs the error correction encoding of the audio data of CH1 to be re-written and of the dummy data to be written on the audio area of CH3, and they are recorded on the audio area of CH1 of the tracks TR2 to TR4 and the audio area of CH3 of the tracks TR5 to TR7 through the recording modulating circuit 16, the recording amplifier 17 and the recording head 18. In this case, the D flag of the audio data of CH3 is made to be activated.

On the other hand, when the D flag of the audio data reproduced from CH3 prior to the rewriting, is found to be inactivated, it means that the significant data are recorded on the audio area of CH3. Thus, the system control circuit 52 instantly stops operations of the erase current amplifier 19 and the recording amplifier 17 as well as running of the magnetic tape T, and displays on the display section (not shown) the message that the significant audio data is recorded on the audio area of CH3 and the data will be lost if the audio data of CH1 is rewritten.

In the digital VTR of the fifth embodiment, there is provided a forcible editing mode for successively processing the editing recording operation by ignoring the D flag activated, and the forcible editing mode can be optionally selected by the user. Thus, when the massage notifying the risk of losing data upon rewriting is displayed on the display section, the user can select the forcible mode to continue the editing recording as long as the loss of the audio data of CH3 is allowable to the user.

According to the digital VTR of the fifth embodiment, upon recording operation, a flag (auxiliary information) for indicating the presence of the significant audio data is added to the audio data of CH3 and CH4. Accordingly, upon performing the editing recording by using a low cost type audio two channel editor, it is possible to prevent the significant data from being erased even when the magnetic tape T recorded with the significant four channel audio data is erroneously installed in the low cost type audio two channel editor.

[Other embodiments]

The present invention is not limited to the embodiments mentioned in the foregoing, and various modifications thereof is available. For instance, the information recorded on the magnetic tape is not limited to the video and audio information but any information is available. Further, the recording medium is not limited to the magnetic tape but it is applicable to the magnetic disc on which information is recorded on a plurality of tracks without guard bands or with narrow guard bands.

Further, the recorded pattern in the embodiments mentioned in the foregoing is shown as such that the audio data of CH1 and CH2 are alternately recorded on every three tracks, but it is not limited to that. It is possible to employ such a tape pattern as the audio data of CH1 and CH2 are recorded every other track or every four tracks.

Furthermore, in the embodiments, the video and audio signals are respectively fed to the corresponding error correction encoding circuit and error correction decoding circuit, but it is possible to feed them to a common error correction encoding circuit and to an error correction decoding circuit. In this case, the video signal processing circuit, and the error correction encoding circuit and the error correction decoding circuit are electrically connected through a bus system, and the video and audio signals are fed in a time divisional manner.

What is claimed is:

1. An information recording/reproducing apparatus for recording information signals on a recording medium in a form of a track pattern having groups of tracks, each group of tracks including first and second tracks abutted on each other, and for reproducing the information signals recorded on the recording medium comprising:

pre-reproduction means for reproducing the information signal recorded on the first track prior to erasing or overwriting the information signal recorded on the second track which abuts on the first track; and re-recording means for re-recording on the first track the information signal previously reproduced form the first track by the pre-reproduction means after the information signal recorded on the second track has been erased or overwritten.

2. An information recording/reproducing apparatus as claimed in claim 1, wherein the re-recording means have error correction encoding means for performing error correction encoding upon recording of the information signal, and the pre-reproduction means have error correction decoding means for performing error correction decoding upon reproducing the information signal and reproduction signal processing means for restoring erratic data which are not correct by the error correction decoding means, wherein the re-recording means performs error correction encoding on the information signal including restored data outputted from the reproduction signal processing means and re-records thereof on the recording medium.

3. An information recording/reproducing apparatus as claimed in claim 1, wherein the re-recording means have error correction encoding means for performing error correction encoding upon recording of the information signal, and the pre-reproduction means have error correction decoding means for performing error correction decoding upon reproducing of the information signal, and the error correction decoding means converts unrecoverable data which are determined to be uncorrectable by the error correction decoding means, into data having a predetermined inhibited value, and the re-recording means performs error correction encoding on the data outputted from the error correction decoding means, and re-records the data outputted on the recording medium.

4. An information recording/reproducing apparatus as claimed in claim 1, wherein the re-recording means performs re-recording, only when the information signal recorded on the second track abutted on the first track without a guard band interposed therebetween is rewritten for a renewal.

5. An information recording/reproducing apparatus as claimed in claim 4, wherein each of the tracks in the form of track pattern, has both a video area for recording a video information signal and an audio area for recording audio information signals of a plurality of channels, the video area contains a unit period of the video information signal, and the audio area contains the audio information signals of the plurality of channels having a period corresponding to the unit period of the video information signal, the audio information signal of one channel is recorded in a series of audio areas residing in a predetermined number of consecutive tracks of more than one, and the re-recording means performs the re-recording only when channels of the audio information signals recorded on the first and second tracks abutted on each other are different to each other.

6. A method for recording/reproducing an information signals on a recording medium in a form of track pattern having groups of tracks, each group of the tracks including first and second tracks abutted on each other, the method comprising the steps of:

reproducing an information signal recorded on an original position in the first track abutted on the second prior to rewriting the information signal in the second track; and recording subsequently to reproducing, the information signal reproduced from the first track on the original position in the first track.

* * * * *